United States Patent Office 2,962,524
Patented Nov. 29, 1960

2,962,524

OXYALKYLENE-CARBOOXYALKYLENE POLYMERS

Fritz Hostettler, Charleston, and Robert W. McLaughlin, Belle, W. Va., assignors to Union Carbide Corporation, a corporation of New York No Drawing. Filed Apr. 18, 1957, Ser. No. 653,524

23 Claims. (Cl. 260—484)

The present invention relates to oxyalkylene-carbooxyalkylene polymers that have utility as non-ionic emulsifiers and are outstandingly useful as intermediates for preparing polyurethane foams, high strength elastomers, coatings and adhesives, and to a method of preparing mixtures thereof.

We have discovered that mixtures of oxyalkylene-carbooxyalkylene polymers of widely varying properties and readily controllable molecular weight, and which may be linear or branched, can be prepared by reaction of a lactone, an epoxide and a polyfunctional compound in the presence of a catalyst. The oxyalkylene-carbooxyalkylene polymers so prepared are characterized by the presence, in their molecular structure, of chains of alkylene links that are linked to one another by means of recurring divalent oxy (—O—) and carbooxy (—COO—) groups. Some or all of the alkylene links may be substituted if desired and the recurrence of the oxy and carbooxy groups may be regular, random or partly regular and partly random.

The lactone used as one of the starting materials may be any lactone, or combination of lactones, having at least four carbon atoms in the ring and represented by the general formula:

I 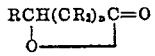

in which $n$ is at least two, all of the R's are hydrogen when $n$ is two, at least six R's are hydrogen when $n$ is more than two, and the remaining R's are hydrogen, alkyl, cycloalkyl, alkoxy or single ring aromatic hydrocarbon radicals.

The lactones preferred as starting materials in the method of this invention are unsubstituted epsilon-caprolactones, epsilon-caprolactones substituted on the carbon atoms in the ring by one, two or three lower alkyl radicals, and unsubstituted delta-valerolactones and gamma-butyrolactones. The preparation of the unsubstituted lactones referred to is well known. The substituted epsilon-caprolactones, and mixtures thereof, can readily be prepared by reacting a corresponding substituted cyclohexanone with an oxidizing agent such as peracetic acid, as described in copending application Serial No. 548,754, filed November 23, 1955, now abandoned. The cyclohexanones may be obtained from substituted phenols or by other convenient synthetic routes. Other lactones that are suitable as starting materials include alkoxy epsilon-caprolactones such as methoxy and ethoxy epsilon-caprolactones, cycloalkyl, aryl and aralkyl epsilon-caprolactones such as cyclohexyl, phenyl and benzyl epsilon-caprolactones, and lactones such as zeta-enantholactone and eta-caprylolactone which have more than six carbon atoms in the ring.

The vicinal epoxides that are useful as starting materials in the method of the invention are represented by the general formula:

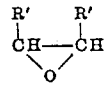

in which the R's are hydrogen, alkyl, chloralkyl, hydroxyalkyl, vinyl or phenyl radicals or in which the two R's form a closed hydrocarbon ring. Among the vicinal epoxides of this description that deserve special mention are ethylene oxide, propylene oxide, 1-methyl-1,2-propylene oxide, 1,2-butylene oxide, butadiene monoxide, epichlorohydrin, glycidol, cyclohexene oxide and styrene oxide. Mixtures of these epoxides are also suitable and in some instances most highly desirable from the point of view of providing a ready means of modifying the properties of the oxyalkylene-carbooxyalkylene polymers that are formed. Ethylene and propylene oxides, and mixtures thereof, are preferred because of their low cost and ease of reaction.

In addition to the monoepoxides described, it is also permissible and within the scope of the invention to use diepoxides in which each oxygen bridge links adjacent carbon atoms if branched-chain oxyalkylene-carbooxyalkylene polymers are desired. Among the diepoxides that are suitable are butadiene dioxide, vinyl cyclohexene dioxide, dicyclopentadiene dioxide, 3,4-epoxy-6-methylcyclohexyl - 3,4 - epoxy - 6 - methylcyclohexane - carboxylate, glycidyl ethers of polyhydric phenols such as bis(1,2 - epoxypropoxy)4,4' - dimethyldiphenylmethane, bis(1,2 - epoxypropoxy)4,4' - diphenylmethane and diglycidyl ether.

The polyfunctional compounds are those having at least two reactive hydrogens that are capable of opening a lactone ring or a vicinal epoxide ring. Typical among compounds useful as such are polyfunctional alcohols, amines, mercaptans, phenols, amino alcohols and mercapto alcohols having the formula:

III  $R''(YH)_z$ 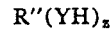

in which $R''$ is an aliphatic, cycloaliphatic, aromatic or heterocyclic radical; $z$ is at least two; and the Y's are —O—, —S—, —NH— or —NR'''—, R''' being an alkyl, aryl, aralkyl or cycloalkyl radical. Diols and polyols of higher functionality are preferred.

The bifunctional compounds such as diols, diamines and amino alcohols having one amino group and one alcohol group are useful primarily in the preparation of substantially linear oxyalkylene-carbooxyalkylene polymers so long as diepoxides are not employed. Representative bifunctional compounds that are suitable include aliphatic diols such as glycols of the general formula $HO(CH_2)_nOH$ in which $n$ equals two to ten, alkylene ether glycols of the formulae $HO[(CH_2)_mO]_nH$ and $HO[CH(CH_3)CH_2O]_nH$ in which $m$ is from two to five and $n$ is one to about ten, 2,2-dimethyl-1,3-propanediol, 2,2-diethyl-1,3-propanediol, 3-methyl-1,5-pentanediol, N-methyl- and N-ethyl diethanolamines; cycloaliphatic diols such as various cyclohexanediols, 4,4'-methylenebiscyclohexanol, 4,4'-isopropylidenebiscyclohexanol; aromatic diols such as hydroquinol; aromatic-aliphatic diols such as various xylenediols, hydroxymethyl-phenethyl alcohols, hydroxymethyl-phenylpropanols, phenylene-diethanols, phenylenedipropanols; and various heterocyclic diols such as 1,4-piperazine diethanol; difunctional amino alcohols such as aliphatic amino alcohols of the general formula $HO(CH_2)_nNH_2$, where $n$ equals 2 to 10, N-methylethanolamine, isopropanolamine, N-methylisopropanolamine; aromatic amino alcohols such as para-aminophenethyl alcohol and para-amino-alpha-methylbenzyl alcohol; various cycloaliphatic amino alcohols such as 4-aminocyclohexanol; diamines of the general formula $H_2N(CH_2)_nNH_2$, monosecondary diamines of the general formula $R'''NH(CH_2)_nNH_2$, and disecondary diamines of the general formula $R'''NH(CH_2)_nNHR'''$, where $n$ equals 2 to 10 and where $R'''$ is alkyl, aryl, aralkyl or cycloalkyl; aromatic diamines such as meta-phenylenediamine, para-phenylenediamine, toluene-2,4-diamine, toluene-2,6-diamine, 1,5-naphthalenediamine, 1,8 - naphthalenediamine, meta - xylylenediamine, para-xylylenediamine, benzidine, 3,3'-dimethyl-4,4'-biphenyldiamine, 3,3'-dimethoxy-4,4'-biphenyldiamine, 3,3'-dichloro - 4,4' - biphenyldiamine, 4,4' - methylenedianiline, 4,4' - ethylenedianiline, 2,3,5,6 - tetramethyl-para-phenylenediamine, 2,5 - fluorenediamine, and 2,7 - fluorenediamine; and cycloaliphatic diamines such as 1,4-cyclohexanediamine, 4,4'-methylenebiscyclohexylamine, and 4,4'-isopropylidenebiscyclohexylamine; and heterocyclic amines such as piperazine, 2,5-dimethylpiperazine, and 1,4-bis(3-aminopropyl)piperazine, as well as corresponding dithiols, thioalcohols and thioamines.

Higher functional compounds, i.e., where $z$ is three or more, are useful in forming branched oxyalkylene-carbooxyalkylene polymers and include higher functional polyols such as glycerol, trimethylolethane, trimethylolpropane, 1,2,4-butanetriol, 1,2,6-hexanetriol, N-triethanolamine, N-triisopropanolamine, erythritol, pentaerythritol, N,N,N',N' - tetrakis(2 - hydroxyethyl)ethylenediamine, dipentaerythritol, sorbitol, alkyl glycosides, and carbohydrates such as glucose, sucrose, starch, and cellulose; amino alcohols such as diethanolamine, diisopropanolamine, 2-(2-aminoethylamino)ethanol, 2-amino-2(hydroxymethyl) - 1,3 - propanediol, and 2 - amino - 2-methyl-1,3-propanediol; and higher functional polyamines such as diethylenetriamine, triethylenetetramine, tetraethylenepentamine, diisopropylenetriamine, 1,2,5-benzenetriamine, toluene-2,4,6-triamine, 4,4',4'-tris(p-aminophenyl)methane, and polyamines obtained by interaction of aromatic monoamines with formaldehyde or other aldehydes, for example:

IV
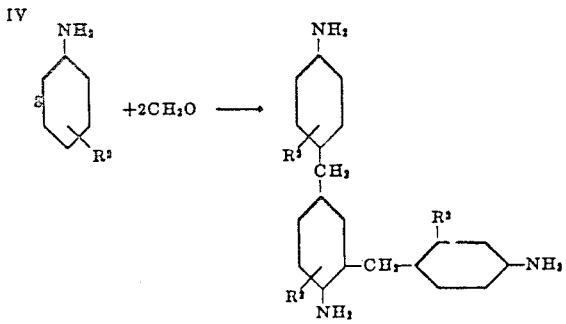

and other reaction products of the above general type, where $R^2$ is H or alkyl.

It is also within the scope of the invention to use, as a polyfunctional compound, one having one or more carboxylic acid groups, i.e., polycarboxylic acids, hydroxy carboxylic acids and amino carboxylic acids. Representative bifunctional compounds of this type include dicarboxylic acids such as pimelic, adipic, phthalic, diphenic acids and naphthalene dicarboxylic acids; and hydroxy- and amino carboxylic acids such as 6-hydroxycaproic, salicylic, 6-aminocaproic and aminobenzoic acids. Suitable higher functional acids include tricarballylic, citric and trimellitic acids. Water and hydrogen sulfide are also suitable as bifunctional compounds for initiating the reaction.

The oxyalkylene-carbooxyalkylene polymers prepared from the preferred starting materials in accordance with the method of the invention are believed to be mixtures corresponding predominantly to one of the general formulae:

V
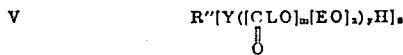

and

VI

in which Y, R'', R''' and z are as defined earlier, the L's are substantially linear lactone residues having the general formula:

VII

in which $n$ and the R's are as described with reference to Formula I, the E's are 1,2-epoxide residues having the general formula:

VIII      $-CH-CH-$
              $|$     $|$
              $R'$   $R'$ wherein the $R$'s are as described with reference to Formula II, the $m$'s are an average of at least one, the $x$'s average from about one-half to about six and one-half, the $y$'s average from about one to about fifty and the L's and E's are in random or ordered distribution, at least some of the L's in a given series being recurrent, i.e., separated from one another by E's, or at least some of the E's in a given series being recurrent, i.e., separated from one another by L's. Formula V represents oxyalkylene-carbooxyalkylene polymers prepared with polyols, polyamines, polymercaptans, amino- and mercapto-alcohols and mercapto-amines as polyfunctional or focal compounds. Formula VI represents oxyalkylene-carbooxyalkylene polymers prepared with polycarboxylic acids as focal compounds. Combinations thereof are possible with the use of hydroxy- and amino carboxylic acids. It is to be understood that the formula represents the predominant structure of the oxyalkylene-carbooxyalkylene polymers and not portions of the structure that are branched due to the use of diepoxide.

If terminal carboxylic acid groups are desired in the oxyalkylene-carbooxyalkylene polymers, the terminal hydroxyl groups may readily be converted by reaction with an excess of a dibasic acid or an anhydride thereof. Succinic, glutaric and phthalic anhydrides are preferred.

While we do not wish to be limited by any theory presented herein, it is believed that the lactone and epoxide molecules are opened in the course of the reaction to form substantially linear carbooxyalkylene and oxyalkylene links, respectively, i.e., substituted or unsubstituted alkylene chains having terminal carbooxy and oxy groups. The opening of one such lactone or epoxide molecule produces a chain having a terminal hydroxyl group which can then open another lactone or epoxide molecule. This produces a lengthening of the chain and the formation of still another hydroxyl for again opening a lactone ring or epoxide bridge. Additional lactone and epoxide residues add on in random fashion to form a chain of lactone residues and epoxide residues in random distribution, said chain in essence comprising a series of alkylene links connected to one another by connecting divalent carbooxy and oxy groups.

To illustrate, it is believed that a lactone is opened by reaction with a hydroxyl group and thus converted into an alkylene link connected by a carbooxy group at one end to a diol residue, for example, and by an oxy group at the other end to a terminal hydrogen, thus:

IX
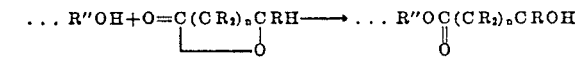
or
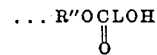

By reaction with a carboxylic acid group, a lactone will open to form an alkylene link having carbooxy groups at both ends, thus:

X
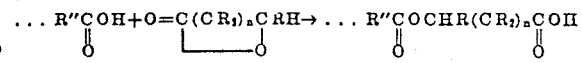

or

If more lactone molecules are available, they will add to previous groups in the same manner. Epoxides are also opened by hydroxyl and carboxylic acid groups to form alkylene links. Thus, for example, ethylene oxide will react with a terminal OH group:

XI

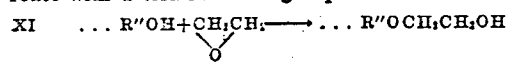

or

... R″OEOH and with a terminal carboxylic acid group:

XII

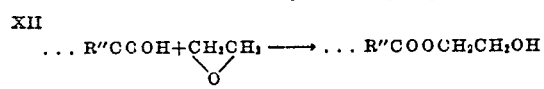

or

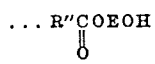

If more epoxide molecules are available, they will add to previous groups in the same manner, forming polyethylene ether chains. When a lactone and an epoxide are both available, they are believed to react in essentially the same manner and add in random fashion to form polyoxyalkylene chains interrupted occasionally by carboxy groups.

It is to be understood and emphasized, therefore, that the L's and E's in general Formula V, for example, can be in random or ordered distribution and that the formula represents the predominant structure of the oxyalkylene-carbooxyalkylene polymers of the invention. The values of $m$ and $x$ in the individual

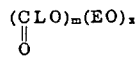

groups may be the same or different and the lengths and structures of the various

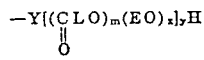

chains need not be the same. The $y$ of one series may in fact equal zero, in which instance the formula may be more specifically expressed as:

XIII

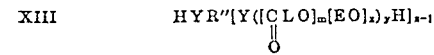

The distribution of the L and E groups in the oxyalkylene-carbooxyalkylene polymers is such that a lactone residue may occur at either or both ends of a series and an epoxide residue may likewise occur at either or both ends of a series. The general Formula V is therefore intended to include structures that may more specifically be set forth as represented by the formulae:

XIV

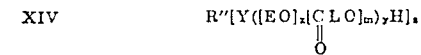

XV

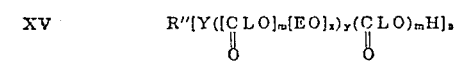

and

XVI

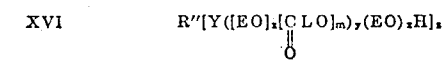

Similar distributions of lactone and epoxide residues are intended to be included within the scope of general Formula VI.

When water is used in place of the organic polyfunctional compounds, the reactions are essentially the same. With hydrogen sulfide, lactones are believed to add on:

XVII

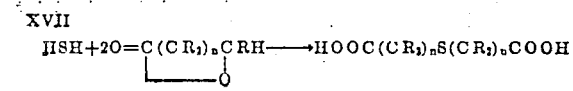

or

HS(CR₂)ₙCOOH and epoxides would open and add:

XVIII    HSH+2CH₂CH₂ → HOCH₂CH₂SCH₂CH₂OH

Additional lactones and epoxides would be opened and add to the chains in the manner described.

A preferred and most direct method of preparing the oxyalkylene-carbooxyalkylene polymers of the invention, provided the polyfunctional compounds chosen do not contain nitrogen atoms carrying reactive hydrogen atoms, is to react the three initial materials described, i.e., the lactone, the epoxide and the polyfunctional compound at an elevated temperature in the presence of a catalyst. By way of illustration, the reaction of ethylene glycol, unsubstituted epsilon-caprolactone and ethylene oxide in accordance with this embodiment of the invention may, for example, be represented by the equation:

XIX

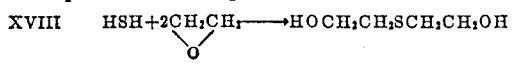

the lactone residues

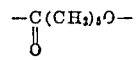

and the epoxide residues —CH₂CH₂O— however being distributed in random fashion within the brackets and the $y$'s being an average of two.

The distribution of the lactone and epoxide residues within the oxyalkylene-carbooxyalkylene polymers prepared in accordance with this embodiment of the method can, as a practical matter, be influenced to a considerable extent by a selection of the temperature at which the starting materials are reacted and the rate at which the reactants are fed to the reaction mixture, although theoretically an efficient distribution is possible at any temperature up to about 150 to 200° C. Generally, lower alkylene epoxides react more rapidly with hydroxyl groups than do the lactones. With increasing molecular weight, epoxides react more slowly and approach the reaction rates of the lactones.

At lower temperatures, i.e., from about 10° C. to about 70° C., maximum intermixing of the lactone and epoxide residues is favored because then the rate at which the lactones react with the hydroxyl groups is slow enough to permit relatively accurate correlation therewith of the rate of addition of epoxide to the reaction mixture. Furthermore, the heat of the exothermic reactions can be removed more effectively at slower reaction rates, thus minimizing acceleration of the reaction rates due to increases in temperature. Thus, for example, if under the conditions of reaction five mols of lactone could be expected to add onto terminal hydroxyls in the course of five minutes, it would be relatively easy to obtain an oxyalkylene-carbooxyalkylene polymer having chain segments alternately and repeatedly having an average of two epoxide residues and one lactone residue by mixing the lactone with the hydroxyl-bearing compound, adding ten mols of epoxide in the course of five minutes and cooling the reaction mixture to keep the temperature, and therefore the reaction rates, relatively constant. This type of oxyalkylene-carbooxyalkylene polymer, in which the random distribution of the epoxide and lactone residues is relatively efficient, is characterized by water-insolubility and by not crystallizing even at temperatures as low as −30° C.

At higher temperature, e.g., from about 70° to 100° C. or higher, the rates of reaction are considerably faster and the difficulty of removing the heat of the reactions for controlling the temperature of reaction are multiplied. As a result, such higher temperatures favor a less efficient distribution of the lactone and epoxide residues with the result that an oxyalkylene-carbooxyalkylene polymer chain will contain a relatively large number of epoxide residues connected to one another in series and such series of epoxide residues are interrupted occasionally by series of lactone residues. Thus, for example, where the epoxide to lactone mol ratio is 2:1, an oxyalkylene-carbooxyalkylene polymer chain obtained at such a higher temperature and feed rate of epoxide may have an average of twenty or thirty epoxide residues connected in seriatim to one another and such series of epoxide residues may be interrupted or terminated by fairly long series of blocks of polylactones having an average of ten or fifteen lactone residues. This type of oxyalkylene-carbooxyalkylene polymer, in which the random distribution of epoxide and lactone residues is relatively inefficient, is characterized by water-solubility and a tendency to crystallize at temperatures of the order of 10° to 15° C.

It will be understood, therefore, that with this knowledge of the reactivity rates of epoxides relative to one another and relative to lactones, and the influence thereon of temperature conditions, suitable adjustments can readily be made to influence the reactions in desired directions and, therefore, the characteristics of the oxyalkylene-carbooxyalkylene polymers and resins prepared therefrom.

Higher temperatures within the operable range of about 10° C. to 150° or 200° C., e.g., above about 100° C., are feasible provided the contact time is made correspondingly short so as to avoid dehydration side reactions, particularly when the catalyst is boron trifluoride. Lower temperatures e.g., as low as 10° C., are operable but require longer reaction times than are considered economically desirable. Generally, therefore, elevated temperatures up to about 100° C. are preferred and temperatures between about 50° and 70° C. are considered optimum for maximum production and control with minimum dehydration.

The reaction is preferably promoted by the presence of Lewis acids such as the trifluoride, tribromide and trichloride of boron, the bromides and chlorides of aluminum, tin and titanium, and the chlorides of antimony, beryllium, bismuth, cadmium, gallium, iron, uranium, zinc and zirconium. The preferred catalysts are boron trifluoride and its complexes with such organic compounds as ethers, alcohols and polyols.

In this embodiment of the method, it is essential to use polyfunctional compounds that do not contain nitrogen atoms for the reason that the Lewis acid catalysts employed in the reaction form inactive complexes with nitrogen atoms. When the oxyalkylene-carbooxyalkylene polymers are to be used in the preparation of flexible foams, it is desirable in this embodiment to avoid using lactones that are substituted on the carbon atom most remote from the carbonyl group of the lactone, e.g., the epsilon carbon of an epsilon-caprolactone. Use of such lactones when a boron trifluoride complex is the catalyst apparently causes dehydration of the secondary hydroxyl group that is formed and then results in a branched-chain structure of high hydroxyl content that is desirable when the oxyalkylene-carbooxyalkylene polymers are to be used in the preparation of a rigid foam.

This method of preparation, referred to as the direct method, is preferred because of a number of significant advantages that it has over other methods to be described. Important among these advantages are its simplicity and economy and the fact that it requires relatively inexpensive equipment and low initial investment.

In accordance with another embodiment of the method, referred to herein as an indirect method, the oxyalkylene-carbooxyalkylene polymers of the invention are prepared in three steps to result in a relatively ordered distribution of oxy and carbooxy groups. The first step involves reacting the initial lactone or mixture of lactones with a molar excess of a monohydric alcohol as indicated in the equation:

XX
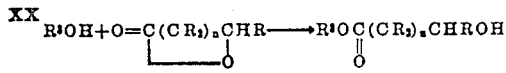

or

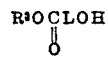

The reaction product of this step is then reacted with one or more vicinal epoxides, or a combination thereof with diepoxide, as illustrated in the equation:

XXI
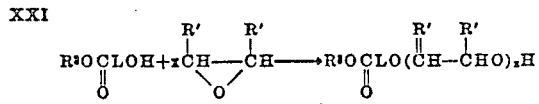

or

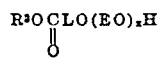

Finally, the resulting oxycarbooxy monomer is reacted with an excess of polyfunctional focal compound acting as a chain stopper, the reaction with a diol being illustrated by the equation:

XXII
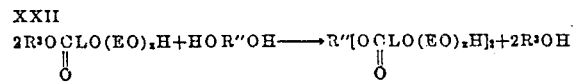

and the residual product self-polymerizes by interaction of its terminal hydroxyls with the interior ester groups and the elimination of excess polyfunctional compound:

XXIII
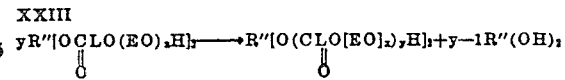

It will be understood, of course, that an amino group on the chain stopper will result in a carbamido linkage between an oxyalkylene-carbooxyalkylene series and the chain stopper residue and that a carboxylic acid group will result correspondingly in a carbooxy or ester type linkage.

The alcohol used in the first step of this embodiment of the invention and symbolized in the equation as R³OH is a primary or secondary monohydric alcohol having a lower boiling point than the polyfunctional chain stopper. Among those suitable for this purpose are aliphatic alcohols such as methanol, ethanol, propanol, isopropanol, 1-butanol, 2-butanol, tert.-butanol, 1-pentanol, 3-pentanol, tert.-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohols such as cyclohexanol and trimethylcyclohexanol. Methyl and ethyl alcohols are preferred.

Lactones having less than six carbon atoms in the ring, i.e., when $n$ is less than four, can be used in accordance with this embodiment of the method even though homopolyesters thereof tend to revert to the monomer at elevated temperatures and therefore do not form stable products. They are suitable here because the addition of as little as one mol of a 1,2-epoxide per mol of lactone results in the preparation of a linear oxyalkylene-carbooxyalkylene polymer in which reversion to small rings is excluded. While it is true that with some of the lower molecular weight lactones somewhat less than 100%, i.e., about 80% and in some instances as low as 60%, conversion takes place, the oxyalkylene-carbooxyalkylene polymers from these lower molecular weight lactones are nevertheless entirely suitable for the purposes of the invention.

The first step in the indirect method is preferably carried out at a temperature of the order of about 60 to 100° C. and in the presence of acidic ester interchange catalysts such as sulfuric, hydrochloric, phosphoric acids and boron trifluoride complexes such as trifluoride ethyl etherate. Basic and neutral ester interchange catalysts that also promote the reaction include such metals as lithium, sodium, potassium, rubidium, caesium, magnesium, calcium, barium, strontium, zinc, aluminum, titanium, cobalt, germanium, tin, lead, antimony, arsenic and cerium, as well as the alkoxides thereof. Additional suitable catalysts are, by way of example, the carbonates of alkali and alkaline earth metals, zinc borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.01 and about 0.5% by weight based on the total charge are suitable. The preferred range is from 0.05 to 0.2%.

In order to obtain an optimum proportion of the hydroxy ester in the first step of this method, it is important to utilize a considerable excess, e.g., five to twenty mols of alcohol per mol of lactone. Thus, for example, by working with a ten-fold excess of alcohol, 60 to 95% of the lactone employed is converted to the hydroxy ester. The remainder consists either of unreacted lactone or of higher alcohol adducts, i.e., compounds in which two or more lactone residues are joined to an alcohol to form a higher molecular weight hydroxy ester. It is quite possible, however, to proceed with a somewhat smaller excess of alcohol and thereby obtain a hydroxy polyester adduct in which the average number of lactone residues added to the alcohol is in excess of one.

After the formation of the hydroxy ester in the first step of this embodiment of the method has been completed, the excess alcohol present in the reaction mixture must be removed. This is most conveniently accomplished by distillation at temperatures as high as 100° C. However, since the ester interchange catalysts used in this step to open the lactone ring also catalyze the reformation of alcohol and lactone, in some instances fairly rapidly at temperatures as low as 50° C., it is necessary to remove or to destroy the catalyst before removal of the excess alcohol. Acidic and basic catalysts such as sulfuric acid and sodium methoxide can easily be converted to inactive salts by neutralization, or they can readily be removed completely by means of ion exchange resins. If, however, the catalyst for the first step is destroyed by formation of an active salt, e.g., sodium sulfate, the hydroxy esters formed in the reaction of the first step must be distilled off because otherwise such salts would interfere with the catalytic process of the second step. Neutral ester interchange catalysts, while plentiful and operable, are difficult to remove or to destroy and are therefore not preferred.

In the second step of the alternative embodiment of the method, the hydroxy esters formed in the first step are reacted with vicinal epoxides in the presence of a catalyst to form lengthened hydroxy esters containing ether groups. The epoxides that are suitable in this step are those that have already been described as corresponding to general Formula II. Mixtures of epoxides are also suitable and in some instances preferred for desirably altering the final structure of the oxyalkylene-carbooxyalkylene polymers. Diepoxides may also be employed in conjunction with the monoepoxides. Ethylene and propylene oxide and mixtures thereof are preferred because of their low cost and ease of reaction.

The catalysts that are most suitable for the second step in an indirect method are the Lewis acids named earlier, particularly boron trifluoride and the complexes thereof with organic compounds as well as aluminum trichloride, zinc chloride and tin chloride. Bases such as tertiary organic amines, sodium and potassium methoxides and hydroxides may also be employed although they are considered not as suitable because they require relatively high reaction temperatures of the order of 90° to 150° C. and high catalyst concentrations of the order of 0.2 to 2% in order to be effective. Thus, while these other catalysts are operable, they are not preferred because of the high temperatures and catalyst concentrations that are necessary and which tend to promote reversion of the hydroxy esters to the initial lactones and alcohols. Boron trifluoride complexes such as the ethyl etherate are preferred.

The operable range of reaction temperatures for the second step of this embodiment of the method of the invention is from below about 10° C. to about 150° C. At the lower temperature range the reaction proceeds slowly, while at the higher temperature range there is danger of ring closure of the hydroxy ester with formation of lactone and alcohol. The preferred temperature range is from 45 to 100° C. since it allows rapid reaction rates with a minimum of reversion to the lactone.

Any unreacted lactone from the first step that remains at the beginning of the second step will take part in the reaction with the vicinal epoxide when a Lewis acid catalyst is employed. The amount of such lactone reacting in the second step depends upon the duration and the temperature of the reaction, the catalyst concentration as well as on the structure of the lactone and the epoxide used.

The oxy-carbooxy monomers obtained in accordance with the second step are polymerized in the third step with the aid of a polyfunctional compound or chain stopper to form linear or branched oxyalkylene-carbooxyalkylene polymers of any desired preselected molecular weight. As indicated previously in the description of the single step method, difunctional chain stoppers tend to yield linear polymers so long as no appreciable amounts of diepoxides have been used. Diepoxides will result in the formation of branched polymers regardless of the functionality of the chain stoppers that are employed in the third step.

The polyfunctional compounds or chain stoppers that are suitable in the third step of this embodiment of the method are generally the polyols, polyamines and amino alcohols described earlier with reference to general Formula III, as well as the polycarboxylic acids, hydroxy carboxylic acids and amino carboxylic acids named earlier in the description of the direct method. Polyols are preferred.

It is important, from the point of view of exercising control over the molecular weight of the oxyalkylene-carbooxyalkylene polymers, to use a considerable excess, preferably about five- to ten-fold the amount stoichiometrically required, of polyfunctional chain stopper in the third step and that the chain stopper be one having a higher boiling point than the alcohol used in the first step. This excess and higher boiling point are required in order to insure a substantial displacement of the monofunctional alcohol from the intermediate product of the second step. In instances in which the chain stopper itself is difficult to remove, e.g., when a higher boiling polyol is employed, the preferred procedure is to use a stoichiometric amount thereof in conjunction with a substantial excess of another polyol that is relatively easy to remove. Thus, for example, where the alcohol used in the first step is methanol and the desired chain stopper is pentaerythritol, it is possible by this procedure to remove substantially completely all of the methanol with a considerable excess of added ethylene glycol and preferentially to retain in the polymer the pentaerythritol rather than the ethylene glycol.

The third step is preferably, but not necessarily, carried out with the use of a catalyst such as a basic or neutral ester interchange catalyst to accelerate the reaction. Among the catalysts that are suitable for this purpose are such metals as lithium, sodium, potassium, rubidium, caesium, magnesium, calcium, barium, strontium, zinc, aluminum, titanium, cobalt, germanium, tin, lead, antimony, arsenic and cerium, as well as the alkoxides thereof. Additional suitable catalysts are, by way of example, zinc borate, lead borate, zinc oxide, lead silicate, lead arsenate, litharge, lead carbonate, antimony trioxide, germanium dioxide, cerium trioxide, magnesium acetate, cobaltous acetate, manganese acetate, lead acetate, lead 2-ethylhexoate, lead salicylate and lead benzoate. Catalyst concentrations between about 0.001 and 1.0%, based on the weight of the starting monomer, are suitable. The preferred range is from 0.01 to 0.5%. The catalyst has also the function of destroying the boron trifluoride complex left in the reaction mixture of step 2, which, if not inactivated, may cause side reactions such as dehydration.

The catalysts that are particularly effective, and therefore preferred, in polymerizing the monomers are the organic tin compounds described in U.S. Patent 2,890,208, the organic titanium compounds described in copending application Serial No. 577,950 filed April 13, 1956, and the titanium chelates and acylates described in U.S. Patent 2,878,236.

The third step of this method is carried out within the temperature range of 120° to 250° C., most effectively between about 120° and 200° C. It is preferably carried out in two stages, the first at a temperature of about 120° to 170° C. and the later stage, for further polymerization, at 150° to 250° C. At temperatures below 150° C., the reaction rate is relatively slow whereas at temperatures above 200° C. there is danger that thermal degradation of the reactants and products may begin to occur. It is desirable, therefore, to carry out the last stage of the third step under a vacuum and to exclude air from the reactants by blowing an inert gas such as nitrogen through the reaction mixture.

The average molecular weight and reactivity of the mixture of oxyalkylene-carbooxyalkylene polymers with materials such as isocyanates can readily be determined by analysis for hydroxyl and carboxyl content. The acid or carboxyl number (mg. of KOH per gram of oxyalkylene-carbooxyalkylene polymer using phenolphthalein as an indicator) is a measure of the number of terminal carboxyl groups. The hydroxyl number, which is a measure of the number of terminal hydroxyl groups and is defined in terms of mg. of KOH per gram of oxyalkylene-carbooxyalkylene polymer, is determined by adding pyridine and acetic anhydride to the oxyalkylene-carbooxyalkylene polymer and titrating the acetic acid formed with KOH. The sum of the acid or carboxyl number and the hydroxyl number, referred to as the reactive number, is an indication of the average number of terminal groups present in the oxyalkylene-carbooxyalkylene polymer and therefore is in turn an indication of the degree of polymerization. A mixture of oxyalkylene-carbooxyalkylene polymers containing long chain molecules will have a relatively low reactive number while oxyalkylene-carbooxyalkylene polymers containing short chain or highly branched molecules will possess relatively higher reactive numbers. Molecular weight can readily be calculated from the hydroxyl and carboxyl numbers and the functionality of the polyfunctional focal compound employed by the formula:

$$\text{XXIV} \quad \text{M.W.} = \frac{\text{Functionality} \times 1000 \times 56.1}{\text{OH No.} + \text{COOH No.}}$$

One of the primary advantages of the oxyalkylene-carbooxyalkylene polymers of this invention is that they can be "tailor-made" as intermediates for a wide variety of polyurethane foams, high strength elastomers, coatings and adhesives and that they can be prepared from relatively inexpensive and readily available starting materials. Another advantage of utmost importance, particularly when they are used as intermediates in the preparation of polyurethanes, is that the entire process can be carried out under anhydrous conditions and that no reaction involved in any of the embodiments described involves the production of water of condensation as is typical, for example, in methods utilizing dicarboxylic acids and diols for the preparation of polyesters.

The method of the invention is subject to precise control as to molecular weight of the product, which may be practically any figure upwards of about 400, as well as the structure of the molecule, i.e., whether it is linear or branched. The properties of the oxyalkylene-carbooxyalkylene polymers may also be controlled by preselecting the relative proportions of the lactones and epoxides and further by preselecting the amounts thereof that are substituted by alkyl or other substituents. Thus, for example, oxyalkylene-carbooxyalkylene polymers, prepared primarily from epsilon-caprolactone and ethylene oxide to have molecular weights of the order of about 1600 to 2800, are water-insoluble liquids when the weight ratio of oxide to lactone is between about 15 : 85 and 55 : 45 (a mol ratio between about 0.5 : 1 and 3.2 : 1) and from slightly to completely water-soluble liquids with increasing proportions of oxide, i.e., between 55 : 45 and about 70 : 30 by weight (molar 3.2 : 1 and 6.5 : 1). With smaller proportions of oxide, the oxyalkylene-carbooxyalkylene polymers tend to crystallize at room or higher temperatures.

Polyurethane elastomers and foams that are made from the oxyalkylene-carbooxyalkylene polymers of the invention by reaction of the terminal hydroxyl groups with polyisocyanates display superior low temperature properties as compared with elastomers and foams produced by isocyanate modification of dicarboxylic acid-diol polyesters and superior cushioning properties as compared with foams made by isocyanate modification of polyalkylene ethers. Flexible materials made from the oxyalkylene-carbooxyalkylene polymers of the invention tend to be more flexible and less subject to hardening as the proportion of substituted lactones used in the formation of the oxyalkylene-carbooxyalkylene polymer is increased, whereas those made from oxyalkylene-carbooxyalkylene polymers in which the only lactones employed are unsubstituted tend to be more rigid and to have higher strength characteristics.

The advantages and utility of the methods and products of the invention will become further apparent from the following detailed examples included to illustrate the best modes now contemplated for carrying out the invention. The hydroxyl and carboxyl numbers referred to in the examples were obtained by the method described in Ind. Eng. Chem., Anal. Ed., vol. 17, page 394 (1945).

*Example 1*

288 grams (2.52 mols) of unsubstituted epsilon-caprolactone and 160 grams (5 mols) of methanol were refluxed for thirty-two hours at 65° to 67° C. in the presence of 0.11 gram of concentrated (96%) sulfuric acid as catalyst. After cooling, the catalyst was neutralized with the calculated amount of sodium methoxide. Excess methanol was removed by distillation at atmospheric pressure and the remaining product was distilled at 88° C. and 2 mm. Hg.

The distillate, 229 grams (1.57 mols) of methyl 6-hydroxycaproate, had a refractive index $n$ 30/D of 1.4344, a saponification equivalent of 147.2 (theory=146.1) and was obtained in 78.8% theoretical yield. The residue product (52 grams) had a hydroxyl number of 188.5, corresponding to an adduct containing an average of between two and three mols of epsilon-caprolactone per mol of methanol.

219 grams (1.5 mols) of the methyl 6-hydroxycaproate thus obtained were mixed with 0.44 gram of boron trifluoride ethyl etherate complex (47% $BF_3$) and heated to 60° C. 132 grams (3 mols) of ethylene oxide were added at 60° to 75° C. over a period of 1.75 hours. The resulting ethylene oxide adduct was obtained in a yield of 351 grams and had a refractive index $n$ 30/D of 1.4461.

100 grams (0.427 mol) of the ethylene oxide adduct were heated to 125° to 130° C. with 2.81 grams (0.045 mol) of ethylene glycol and 0.1 gram of dibutyltin oxide as catalyst, whereupon methanol began distilling over. The temperature was gradually increased to 170° C. and in the course of 2.75 hours, 16 ml. of methanol were collected. The reactants were then placed into a vacuum of 5 mm. Hg for ten minutes. The resulting mixture of oxyalkylene-carbooxyalkylene polymers was obtained in a yield of 86 grams, had a slightly yellow color, a refractive index $n$ 30/D of 1.4675, a hydroxyl number of 60.6, a carboxyl number of 2.5 and an average molecular weight of about 1710.

*Example 2*

312 grams (2 mols) of a mixture of beta,beta,delta- and beta,delta,delta-trimethyl-epsilon-caprolactones and 640 grams (20 mols) of methanol were heated under reflux at 65° to 67° C. for twenty-four hours in the presence of 0.312 gram of concentrated (96%) sulfuric acid as catalyst. After cooling, the acid catalyst was removed by contact with an anion exchange resin available under the tradename "Nalcite SAR." The excess methanol was removed by distillation under vacuum. 368 grams (about 1.95 mols) of a residue product were obtained.

This residue product, without being distilled, was heated to 60° C. with 0.88 gram of boron trifluoride ethyl etherate (47% $BF_3$) and 174 grams (4 mols) of ethylene oxide were added in the course of thirty-seven minutes while the temperature was 60° to 75° C. The reactants were then held at 60° C. for another thirty minutes. 532 grams of product were obtained.

The entire product was heated with 30.1 grams (0.485 mol) of ethylene glycol and 1.1 ml. tetraisopropyl titanate as catalyst at 180° C. for twenty hours while methanol was removed by distillation. The reactants were then subjected to a vacuum of 3 to 4 mm. Hg while 114 grams of non-polymerized monomer distilled over. The remaining oxyalkylene-carbooxyalkylene polymer was a yellow product having a hydroxyl number of 45.4, a carboxyl number of 1.0 and an average molecular weight of about 2370.

*Example 3*

320 grams (2.5 mols) of a mixture of methyl-epsilon-caprolactones, obtained from a mixture of 2-, 3- and 4-methylcyclohexanones, and 800 grams (25 mols) of methanol were refluxed at 65° to 67° C. for twenty-four hours with 0.32 gram of concentrated (96%) sulfuric acid as catalyst. The acid catalyst was then neutralized by percolating over "Nalcite SAR" anion exchange resin. After removal of the excess methanol under vacuum, 394 grams of residue product, consisting mostly of the methyl esters of the hydroxy acids, resulted.

The 394 grams of product were heated to 60° C. with 0.94 gram boron trifluoride ethyl etherate (47% $BF_3$). 217 grams (4.93 mols) of ethylene oxide were then added in the course of forty-five minutes while the temperature was maintained between 60° and 76° C. The reactants were then heated for an additional hour at 60° to 70° C. The resulting ethylene oxide adduct was a slightly yellow colored liquid.

611 grams of the ethylene oxide adduct were mixed with 44 grams (0.71 mol) of ethylene glycol and heated to 170° C. for twenty hours in the presence of 1.2 ml. tetraisopropyl titanate while 96 ml. of methanol distilled off. The reactants were then subjected to a vacuum of 20 mm. Hg whereby 24 grams of non-polymerized product distilled over. The resulting oxyalkylene-carbooxyalkylene polymer was a yellow colored viscous liquid having a hydroxyl number of 48.6, a carboxyl number of 1.0 and an average molecular weight of about 2220.

*Example 4*

355 grams (2.5 mols) of a mixture of dimethyl-epsilon-caprolactones, obtained from a xylenol fraction boiling at 212.5 to 226° C., and 800 grams (25 mols) of methanol were heated under reflux at 65° to 67° C. for twenty-four hours in the presence of 0.355 gram of concentrated (96%) sulfuric acid as catalyst. The acid catalyst was then neutralized by percolating over "Nalcite SAR" anion exchange resin. Excess methanol was removed under vacuum, leaving 425 grams (about 2.44 mols) of a residue consisting primarily of methyl 6-hydroxy dimethyl caproates.

The product thus obtained (425 grams) was heated to 60° C. with 1.01 grams boron trifluoride ethyl etherate (47% $BF_3$). 215 grams (4.9 mols) of ethylene oxide were then added at 60° to 76° C. in the course of thirty-five minutes while the reactants were cooled. The reactants were then kept at 60° C. for an additional hour. The resulting ethylene oxide adduct was colorless.

The adduct thus obtained (640 grams) was heated at 170° C. for twenty hours with 42 grams (0.678 mol) of ethylene glycol and 1.3 ml. tetraisopropyl titanate as catalyst while 92.5 ml. of methanol were distilled off. The product was then subjected to a vacuum of 20 mm. Hg while being maintained at 170° C. and 27 grams of unreacted monomer were collected. The oxyalkylene-carbooxyalkylene polymer that remained had a yellow color, a hydroxyl number of 57, a carboxyl number of 1 and an average molecular weight of about 1910.

*Example 5*

2280 grams (20 mols) of unsubstituted epsilon-caprolactone and 8000 ml. methanol were refluxed for twenty hours at 65° to 67° C. with 2.28 grams of concentrated (96%) sulfuric acid as catalyst. After cooling, the acid catalyst was removed by percolating over "Nalcite SAR" anion exchange resin. The methanol was then removed under vacuum and 2830 grams of residue product, consisting mainly of methyl 6-hydroxycaproate, were obtained.

2809 grams (19.25 mols) of the residue product thus obtained were heated to 60° C. with 6.65 grams boron trifluoride ethyl etherate (47% $BF_3$). 1698 grams (38.5 mols) of ethylene oxide were then added in the course of 5.5 hours while cooling to maintain the temperature at 60° to 67° C.

(A) One 500 gram (2.13 mols) portion of the ethylene oxide adduct thus obtained was heated at 170° C. under nitrogen for twenty hours with 13.4 grams (0.1 mol) of 1,2,6-hexanetriol and 6.2 grams (0.1 mol) of ethylene glycol in the presence of 1 ml. tetraisopropyl titanate while 75 ml. of methanol distilled off. The reactants were then placed under a vacuum of 10 mm. Hg for ten hours, during which time only a small quantity of monomeric material distilled off. The oxyalkylene-carbooxyalkylene polymer thus obtained was a yellow colored viscous liquid having a hydroxyl number of 38.9, a carboxyl number of 1.3 and an average molecular weight of about 4000.

(B) Another 500 gram portion of the ethylene oxide adduct was heated to 170° C. for twenty hours with 10.5 grams of 2-amino-2-methyl-1,3-propanediol and 6.2 grams of ethylene glycol in the presence of 1 ml. tetraisopropyl titanate as catalyst while 80 ml. of methanol distilled off. The reactants were then placed under a vacuum of 2 mm. Hg for three hours while remaining at the same temperature. The resulting oxyalkylene-carbooxyalkylene polymer was a brown viscous liquid having a hydroxyl number of 34.7, a carboxyl number of 1.0 and an average molecular weight of about 4600.

(C) A 250 gram portion of the ethylene oxide adduct was heated to 170° C. for twenty hours with 19.8 grams of 4,4'-methylenedianiline in the presence of 0.5 ml. tetraisopropyl titanate as catalyst while 32 ml. of methanol distilled over. The reactants were then placed under a vacuum of 5 mm. Hg for two hours while being maintained at the same temperature. The resulting oxyalkylene-carbooxyalkylene polymer was a viscous brown liquid having a hydroxyl number of 49.5, a carboxyl number of 1.35 and an average molecular weight of about 2150.

Example 6

500 grams (5 mols) of delta-valerolactone were refluxed at 65° to 67° C. for twenty hours with 2000 ml. of methanol in the presence of 0.92 gram concentrated (96%) sulfuric acid. After cooling, the acid catalyst was removed by percolating over "Nalcite SAR" anion exchange resin. The excess methanol was then distilled off in a vacuum at a temperature below 60° C. 641 grams of residue, consisting mostly of methyl 5-hydroxyvalerate, were obtained.

The 641 grams (4.85 mols) of methyl 5-hydroxyvalerate were heated to 60° C. with 1.42 grams of boron trifluoride ethyl etherate (47% $BF_3$). 429 grams (9.75 mols) of ethylene oxide were then added in the course of 2.2 hours at a temperature of 60° to 70° C. The reactants were then maintained at 60° C. for an additional hour.

(A) 550 grams of the ethylene oxide adduct thus obtained were heated to 170° C. for twenty hours with 18.6 grams of ethylene glycol in the presence of 1.1 ml. tetraisopropyl titanate as catalyst while 79 ml. of methanol distilled off. The reactants were then placed under a vacuum of 5 to 7 mm. Hg and 188 grams of unreacted monomer, mainly delta-valerolactone, were recovered. The oxyalkylene-carbooxyalkylene polymer residue was a yellow viscous liquid having a hydroxyl number of 34.0, a carboxyl number of 1.7 and an average molecular weight of about 3000.

(B) 100 grams of the ethylene oxide adduct of methyl 5-hydroxyvalerate were heated to 170° C. for twenty hours with 100 grams of an ethylene oxide adduct of methyl 6-hydroxycaproate and 4.37 grams of ethylene glycol in the presence of 0.6 ml. tetraisopropyl titanate while 35 ml. of methanol distilled off. The products were subjected to a vacuum of 4 mm. Hg and 29 grams of unreacted monomer were removed. The resulting oxyalkylene-carbooxyalkylene polymer was a yellow viscous liquid having a hydroxyl number of 33.0, a carboxyl number of 2.0 and an average molecular weight of about 3030.

Example 7

500 grams (5.8 mols) of gamma-butyrolactone were refluxed for twenty hours at 65° to 67° C. with 2320 ml. of methanol in the presence of 0.92 gram concentrated (96%) sulfuric acid as catalyst. After cooling, the acid catalyst was removed by percolating over "Nalcite SAR" anion exchange resin. The excess of methanol was distilled off under vacuum at below 60° C. and 623 grams of residue product, consisting mainly of methyl 4-hydroxybutyrate, were obtained.

The 623 grams of methyl 4-hydroxybutyrate were heated to 60° C. with 1.47 grams of boron trifluoride ethyl etherate (47% $BF_3$). 510 grams (11.6 mols) of ethylene oxide were then added in the course of 1.5 hours at a temperature of 60° to 70° C. and the reaction product was maintained at 60° C. for one additional hour.

(A) 550 grams of the ethylene oxide adduct thus obtained were heated to 170° C. for twenty hours with 18.6 grams of ethylene glycol and 1.1 ml. tetraisopropyl titanate as catalyst while 61 ml. of methanol distilled over. The reactants were then placed under a vacuum of 25 mm. Hg whereby 200 grams of unreacted monomer, consisting primarily of gamma-butyrolactone, were recovered. The resulting oxyalkylene-carbooxyalkylene polymer was a yellow viscous liquid having a hydroxyl number of 57.6, a carboxyl number of 2.0 and an average molecular weight of about 1820.

(B) 100 grams of the ethylene oxide adduct of methyl 4-hydroxybutyrate, obtained in accordance with this example, were mixed with 100 grams of the ethylene oxide adduct of methyl 6-hydroxycaproate and 18.6 grams of ethylene glycol and heated to 170° C. for twenty hours in the presence of 0.6 ml. tetraisopropyl titanate as catalyst while 28 ml. of methanol distilled off. The reactants were then subjected to a vacuum of 20 mm. Hg and 44 grams of unreacted monomer, consisting mostly of gamma-butyrolactone, were recovered. The resulting oxyalkylene-carbooxyalkylene polymer was a yellow viscous liquid having a hydroxyl number of 45.5, a carboxyl number of 2.0 and an average molecular weight of about 2260.

Example 8

Three direct preparations of oxyalkylene-carbooxyalkylene polymers were conducted, the only conditions varied being the time and temperature of polymerization. In each operation, 228 grams (2 mols) of unsubstituted epsilon-caprolactone were heated with 11.4 grams (.184 mol) of ethylene glycol in the presence of 0.48 gram boron trifluoride ethyl etherate (47% $BF_3$) as catalyst and 176 grams (4 mols) of ethylene oxide were added in the course of the time specified. The time and temperature of each operation and the results, in terms of the hydroxyl number, carboxyl number, average molecular weight, melting point, color and water solubility of the resulting viscous liquid mixtures of oxyalkylene-carbooxyalkylene polymers are tabulated immediately below:

|  | Test A | Test B | Test C |
| --- | --- | --- | --- |
| Reaction: |  |  |  |
| Temperature, ° C | 90 | 90 | 60–70. |
| Time, hrs | 5.5 | 10 | 5.5. |
| Product: |  |  |  |
| Hydroxyl number | 47.2 | 46.8 | 50.5. |
| Carboxyl number | 2.0 | 2.0 | 2.0. |
| Molecular weight | 2,190 | 2,210 | 2,060. |
| Melting point, ° C | 10–14 | 10–15 | Below –30. |
| Color | Yellow |  | Yellow. |
| Water solubility | Yes | Very soluble | Very slight. |

NOTE.—The product in Test C showed no sign of crystallization at temperatures as low as –30° C.

Example 9

256 grams (2 mols) of a mixture of methyl-epsilon-caprolactones, obtained from a mixture of 2-, 3- and 4-methylcyclohexanones, was heated to 60° C. with 12.35 grams (0.2 mol) of ethylene glycol in the presence of 0.6 gram boron trifluoride ethyl etherate (47% $BF_3$) as catalyst and 176 grams (4 mols) of ethylene oxide were added over a period of seven hours while the reaction mix was maintained at 60° to 70° C. An additional 0.6 gram of boron trifluoride ethyl ethereate complex was added in small increments during the reaction. After completion of the reaction, the catalyst was neutralized with a calculated amount of sodium methoxide and the product was subjected to a vacuum of 2 mm. Hg at 140° C. No unreacted monomer distilled over, thus indicating complete polymerization of the initial reactants.

The resulting oxyalkylene-carbooxyalkylene polymer was a yellow viscous liquid, very slightly soluble in water, having a hydroxyl number of 83.2 and a carboxyl number of 0.6. The high hydroxyl number indicates that some branching occurred during the polymerization reaction.

Example 10

300 grams (2.63 mols) of unsubstituted epsiloncaprolactone were heated to 60° C. with 13.4 grams (.146 mol) of trimethylolpropane in the presence of 0.71 gram boron trifluoride ethyl etherate (47% $BF_3$) as catalyst. 198 grams (4.5 mols) of ethylene oxide were then added in the course of 5.5 hours while the reaction mix was maintained at 60° C., whereafter the reaction mixture was held at that temperature for an additional hour to react any dissolved epoxide.

The resulting mixture of polymers was a yellow viscous liquid having a hydroxyl number of 41.3, a carboxyl number of 1.2 and an average molecular weight of 3850.

Example 11

67 grams (.52 mol) of gamma-methyl-epsilon-caprolactone and 133 grams (1.04 mols) of a mixture of beta-, and delta-methyl-epsilon-caprolactones were heated to 60° C. with 9.4 grams (.153 mol) of ethylene glycol and 0.47 gram boron trifluoride ethyl etherate (47% $BF_3$) as catalyst. 133 grams (3.02 mols) of ethylene oxide were then added over a period of 5.5 hours while the temperature of the reaction mix was maintained at 60° C.

The resulting mixture of polymers was a yellow viscous liquid having a hydroxyl number of 55.3, a carboxyl number of 2.6 and an average molecular weight of 1920.

Example 12

300 grams (2.34 mols) of a mixture of methyl-epsilon-caprolactones were heated to 60° C. with 13.4 grams (.146 mol) of trimethylolpropane in the presence of 0.71 gram boron trifluoride ethyl etherate (47% $BF_3$) as catalyst. 200 grams (4.55 mols) of ethylene oxide were then added over a period of 5.5 hours while the reaction mix was maintained at 60° C. During the addition of the oxide, an additional 1.19 grams of boron trifluoride ethyl etherate was added periodically in small increments.

The resulting mixture of polymers was a yellow viscous liquid having a hydroxyl number of 95.1 and a carboxyl number of 1.3.

Example 13

228 grams (2 mols) of unsubstituted epsilon-caprolactone were heated to 60° C. with 12.9 grams (.208 mol) of ethylene glycol in the presence of 0.55 gram boron trifluoride ethyl etherate (47% $BF_3$) as catalyst. 152 grams (3.45 mols) of ethylene oxide and 76 grams (1.31 mols) of propylene oxide were added over a period of 5.2 hours while the reaction mix was maintained at 60° to 67° C.

The resulting mixture of polymers was an orange colored viscous liquid having a hydroxyl number of 86.3 and a carboxyl number of 1.3.

Example 14

250 grams (1.76 mols) of dimethyl-epsilon-caprolactones were heated to a temperature of 55° to 60° C. with 14 grams (.225 mol) of ethylene glycol in the presence of 0.6 gram boron trifluoride ethyl etherate (47% $BF_3$) as catalyst. 250 grams (5.7 mols) of ethylene oxide were added over a period of 5.2 hours while the reaction mix was maintained at 55° to 60° C. The reactants were then subjected to a vacuum of 4 to 2 mm. Hg at 55° C., whereby 30 grams of low boiling material, mainly dioxane, distilled off.

The resulting mixture of polymers was a pale yellow viscous liquid having a hydroxyl number of 166 and a carboxyl number of 1.6.

Example 15

250 grams (2.91 mols) of gamma-butyrolactone were heated to a temperature of 65° C. with 13.4 grams (0.1 mole) of trimethylolpropane in the presence of 0.6 gram boron trifluoride ethyl etherate (47% $BF_3$) as catalyst. 250 grams (5.7 mols) of ethylene oxide were added over a period of 5.66 hours while the reaction mix was maintained at 65° C. 2.3 grams of dibutyltin oxide were then added to destroy the boron trifluoride complex. The reactants were then subjected to a vacuum of 4 mm. Hg at temperatures up to 150° C. whereby 110 grams of distillate, consisting mainly of gamma-butyrolactone, were recovered.

The resulting oxyalkylene-carbooxyalkylene polymer was a pale yellow viscous liquid having a hydroxyl number of 54.0, a carboxyl number of 3.5 and an average molecular weight of 2760.

Example 16

250 grams (2.5 mols) of delta-valerolactone were heated to a temperature of 65° C. with 14.1 grams (.227 mol) of ethylene glycol in the presence of 0.6 gram boron trifluoride ethyl etherate (47% $BF_3$) as catalyst. 250 grams (5.7 mols) of ethylene oxide were added in the course of 5.5 hours while the reaction mix was maintained at 65° C. 2.3 grams of dibutyltin oxide were then added to destroy the boron trifluoride complex. The reaction mix was then subjected to a vacuum of 4 mm. Hg at temperatures up to 150° C. whereby 113 grams of distillate, consisting mainly of delta-valerolactone, were recovered.

The resulting oxyalkylene-carbooxyalkylene polymer was a pale brown viscous liquid having a hydroxyl number of 45.4, a carboxyl number of 8.0 and an average molecular weight of 1830.

Example 17

250 grams (2.19 mols) of unsubstituted epsilon-caprolactone were heated to 60° C. with 89.3 grams (.97 mol) of trimethylolpropane in the presence of 1.9 grams boron trifluoride ethyl etherate (47% $BF_3$) as catalyst. 250 grams (5.7 mols) of ethylene oxide were added in the course of five hours while the reaction mixture was maintained at 60° C. The reactants were then subjected to a vacuum of 4 mm. Hg at temperatures up to 60° C. whereby 3 grams of dioxane distilled over.

The resulting oxyalkylene-carbooxyalkylene polymer was a colorless liquid having a hydroxyl number of 190, a carboxyl number of 1.4 and an average molecular weight of about 870.

Example 18

The procedure of Example 17 was repeated with 44.6 grams (.485 mol) of trimethylolpropane and 0.6 gram of catalyst, the reaction time being 4.75 hours. Upon being subjected to a vacuum of 4 mm. Hg at temperatures up to 60° C., 13 grams of dioxane were recovered.

The resulting oxyalkylene-carbooxyalkylene polymer was a colorless liquid having a hydroxyl number of 107.5, a carboxyl number of 1.7 and an average molecular weight of about 1520.

Example 19

250 grams (2.2 mols) of unsubstituted epsilon-caprolactone were heated to a temperature of 90° C. with 36.5 grams (0.25 mol) adipic acid in the presence of 0.6 gram boron trifluoride ethyl etherate (47% $BF_3$) as catalyst. 260 grams (5.9 mols) of ethylene oxide were then added over a period of four hours while the reaction mix was maintained at 80 to 90° C.

The resulting oxyalkylene-carbooxyalkylene polymer was a yellow viscous product having a hydroxyl number of 26.2, a carboxyl number of 15.3 and an average molecular weight of about 1975.

Example 20

2560 grams (20 mols) of mixed methyl-epsilon-caprolactones were refluxed for seventeen hours with 6400 grams (200 mols) of methanol in the presence of 3.0 grams concentrated (96%) sulfuric acid. After cooling, the acid catalyst was removed by percolating over "Nalcite SAR" anion exchange resin. The excess methanol was then distilled off in a vacuum at a temperature below 60° C. 3000 grams of residue, consisting mostly of methyl-6-hydroxy methylcaproate, were obtained.

1396 grams (8.73 mols) of the above methyl-6-hydroxy methylcaproate were heated to 60° C. with 3.3 grams of borontrifluoride ethyl etherate (47% $BF_3$). 1396 grams (31.7 mols) of ethylene oxide were then added in the course of 4.0 hours at a temperature of 60° to 70° C. The reactants were then maintained at 60° C. for an additional hour. 2.34 grams of N-methylmorpholine were then added to destroy the boron trifluoride ethyl etherate.

1775 grams of the ethylene oxide adduct thus obtained were heated to 170° C. for twenty hours with 497 grams of ethylene glycol in the presence of 3.55 grams of tetraisopropyl titanate as catalyst while 174 ml. of methanol distilled off. The reactants were then placed under a vacuum of 14 mm. Hg and 476 grams of methanol and excess glycol distilled off.

The oxyalkylene-carbooxyalkylene polymer was a light brown viscous liquid having a hydroxyl number of 46.9, a carboxyl number of 0.64 and an average molecular weight of about 2340.

*Example 21*

2840 grams (20 mols) of mixed dimethyl-epsilon-caprolactones were refluxed for twenty hours with 6400 grams (200 mols) of methanol in the presence of 2.84 grams of concentrated (96%) sulfuric acid. After cooling, the acid catalyst was removed by percolating over "Nalcite SAR" anion exchange resin. The excess methanol was then distilled off in a vacuum at a temperature below 60° C. 3317 grams of residue, consisting mostly of methyl-6-hydroxy dimethylcaproate, were obtained.

1497 grams (8.62 mols) of the above methyl-6-hydroxy dimethylcaproate were heated to 60° C. with 2.85 grams of boron trifluoride ethyl etherate (47% $BF_3$). 1331 grams (30.3 mols) of ethylene oxide were then added in the course of 4.0 hours at a temperature of 60° to 70° C. The reactants were then maintained at 60° C. for an additional hour. 2.2 grams of N-methylmorpholine were then added to destroy the boron trifluoride ethyl etherate.

1828 grams of the ethylene oxide adduct thus obtained were heated to 170° C. for approximately twenty hours with 566 grams of ethylene glycol in the presence of 5.0 grams of tetraisopropyl titanate as catalyst while 186 ml. of methanol distilled off. The reactants were then placed over a vacuum of 4 mm. Hg and 545 grams of material distilled off (mostly glycol). The oxyalkylene-carbooxyalkylene polymer was a yellow viscous liquid having a hydroxyl number of 67.4, a carboxyl number of 0.65 and an average molecular weight of about 1670.

The use of water as a focal compound or initiator is illustrated by the following example:

*Example 22*

250 grams (2.2 mols) of epsilon-caprolactone were heated to 60° C. with 4.5 grams (0.25 mol) of water in the presence of 0.6 gram boron trifluoride ethyl etherate (47% $BF_3$) as catalyst. 250 grams (5.7 mols) of ethylene oxide were then added over a period of 5.0 hours while the reaction mix was maintained at 60° to 90° C.

The resulting oxyalkylene-carbooxyalkylene polymer was a practically colorless viscous liquid having a hydroxyl number of 38.6, a carboxyl number of 10.3 and an average molecular weight of 1900. It was slightly soluble in water.

The effect of varying the relative proportions of the oxyalkylene and carbooxyalkylene links in the polymer mixture is demonstrated in the following example, from which it is apparent that this ratio may vary between about 15:85 and 70:30 by weight or between about 0.5:1 and 6.5:1 on a molar basis. The example also demonstrates that when the proportion of oxide to lactone becomes greater than about 50:50 by weight or about 2.5:1 on a molar basis, the resulting mixture of polymers becomes increasingly soluble in water.

*Example 23*

Epsilon-caprolactone was in each instance heated to 60° C. with ethylene glycol in the presence of boron trifluoride ethyl etherate (47% $BF_3$) as catalyst, whereupon ethylene oxide was added over a period of time while the reaction mix was maintained at 60° C. The amounts of reactants involved, the period of time used to add ethylene oxide to the reaction mix and the characteristics of the resulting polymer mixture are tabulated immediately below:

| Run No. | A | B | C | D | E |
| --- | --- | --- | --- | --- | --- |
| Epsilon-caprolactone: | | | | | |
| Grams | 200 | 150 | 225 | 456 | 456. |
| Mols | 1.75 | 1.3 | 2.0 | 4.0 | 4.0. |
| Ethylene glycol: | | | | | |
| Grams | 15.5 | 15.5 | 15.5 | 20.2 | 17.4. |
| Mols | 0.25 | 0.25 | 0.25 | 0.33 | 0.28. |
| Catalyst, grams | 0.3 | 0.3 | 0.6 | 0.6 | 0.6. |
| Ethylene oxide: | | | | | |
| Grams | 306 | 350 | 275 | 1.76 | 83. |
| Mols | 6.95 | 7.95 | 6.25 | 4.0 | 2.0. |
| Time of addition, hrs. | 4.5 | 5.0 | 5.25 | 5.0 | 5.0. |
| Polymer properties: | | | | | |
| Color | Water white | Light yellow | Colorless | Light yellow | White. |
| State | Viscous liquid | Viscous liquid | Viscous liquid | Viscous liquid | Wax-like solid. |
| Melting point | | | Below −30° C. | Below −30° C. | 25–27° C. |
| Hydroxyl number | 51.5 | 50.8 | 65.2 | 60.2 | 48.0. |
| Average molecular weight | 2,180 | 2,200 | 1,720 | 1,860 | 2,340. |
| Oxide content, percent by weight | 58.7 | 68 | 53.3 | 26.6 | 15.5. |
| Solubility in water | Soluble | Soluble | Slightly soluble | Insoluble | Insoluble. |

The following example is illustrative of the utility of a typical oxyalkylene-carbooxyalkylene polymer mixture in forming a lightweight elastic foam by reacting a polyisocyanate and water.

*Example 24*

1100 grams (9.65 mols) of unsubstituted epsilon-caprolactone, 56.8 grams (.92 mol) ethylene glycol and 6.2 grams (.045 mol) trimethylolpropane were heated to a temperature of 60° to 70° C. in the presence of 2.6 grams boron trifluoride ethyl etherate (47% $BF_3$) as catalyst and 1100 grams (25 mols) ethylene oxide were added thereto in the course of 5.25 hours. The resulting mixture of oxyalkylene-carbooxyalkylene copolymers was a yellow liquid having a carboxyl number of 1.6 and a hydroxyl number of 49.1.

75 grams of the oxyalkylene-carbooxyalkylene copolymers thus prepared were mixed with 2.2 grams water, one gram of a polyoxyethylated vegetable oil known as "Emulphor El 719" and 2 grams N-methylmorpholine. 28 grams of a mixture of 65% 2,4- and 35% 2,6-tolylene diisocyanates containing 0.5% "Ethocell," an ethoxylated cellulose having an average ethoxy content of 47.5 to 49%, were then added under intensive agitation. As soon as the foaming reaction began, the mixture was transferred into an open mold and allowed to expand.

The foam produced was removable from the mold after one hour, but was allowed to set for twenty-four hours at room temperature for complete curing. The test results were as follows:

Density, lbs./cu. ft. _____ 2.62
Tensile strength, p.s.i. _____ 29
Load at 10% deflection, p.s.i. _____ 0.96
Load at 50% deflection, p.s.i. _____ 1.56

LOAD VERSUS TEMPERATURE AT 25% DEFLECTION

| Temp., °C. | Load, p.s.i. |
|---|---|
| 20 | 1.2 |
| 0 | 1.4 |
| −10 | 1.6 |
| −20 | 1.75 |
| −30 | 2.5 |
| −40 | 3.7 |

Example 24 also demonstrates the very effective cushioning action obtainable with a flexible foam having a density as little as 2.62 lbs./cu. ft. when prepared from an oxyalkylene-carbooxyalkylene copolymer mixture prepared in accordance with the method of the invention by using a combination of bi- and trifunctional focal compound.

It is to be expected that numerous modifications will readily become apparent to those skilled in the art upon reading this description. All such modifications are intended to be included within the scope of the invention as defined in the appended claims.

We claim:

1. A mixture of oxyalkylene-carbooxyalkylene polymers having terminal hydroxy groups prepared by heating to an elevated temperature a lactone having the general formula

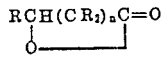

in which $n$ is an integer from 2 to 6, the R's are hydrogens when $n$ is 2 and at least six R's are hydrogens when $n$ is more than 2, any remaining R's being lower alkyl groups, a vicinal epoxide and a compound having at least two reactive hydrogens that are capable of opening lactone and vicinal epoxide rings and selected from the group consisting of alcohols, amines, mercaptans, phenols, amino alcohols, mercapto alcohols, polycarboxylic acids hydroxy carboxylic acids, amino carboxylic acids, water and hydrogen sulfide, the relative proportions by weight of the epoxide and the lactone being between about 15:85 and 70:30.

2. Product defined in claim 1 wherein the lactone is an epsilon-caprolactone.

3. Product defined in claim 1 wherein the lactone is a mixture of methyl-substituted epsilon-caprolactones.

4. Product defined in claim 1 wherein the lactone is a delta-valerolactone.

5. Product defined in claim 1 wherein the lactone is a gamma-butyrolactone.

6. Product defined in claim 1 wherein the vicinal epoxide is ethylene oxide.

7. Product defined in claim 1 wherein the vicinal epoxide is a mixture of ethylene oxide and propylene oxide.

8. Method which comprises heating to an elevated temperature a lactone having the general formula

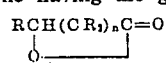

in which $n$ is an integer from 2 to 6, the R's are hydrogens when $n$ is 2 and at least six R's are hydrogens when $n$ is more than 2, any remaining R's being lower alkyl groups, a vicinal epoxide and compound having at least two reactive hydrogens that are capable of opening lactone and vicinal epoxide rings and selected from the group consisting of alcohols, amines, mercaptans, phenols, amino alcohols, mercapto alcohols, carboxylic acids, hydroxy carboxylic acids, amino carboxylic acids, water and hydrogen sulfide to form a mixture of hydroxyl-terminated oxyalkylene-carbooxyalkylene polymers.

9. Method as defined in claim 8 wherein the reactants are heated to a temperature up to about 100° C.

10. Method as defined in claim 8 wherein the reactants are heated to a temperature between about 50° and 70° C.

11. Method as defined in claim 8 wherein the reactants are heated to a temperature up to about 100° C. and the polyfunctional compound has more than two functional groups.

12. Method as defined in claim 8 wherein the reactants are heated to a temperature up to about 100° C. and the polyfunctional compound is a diol.

13. Method as defined in claim 8 wherein the reactants are heated to a temperature up to about 100° C., the polyfunctional compound is a diol and part of the vicinal epoxide is a diepoxide.

14. Method as defined in claim 8 wherein the reactants are heated to a temperature up to about 100° C. and the proportion by weight of epoxide to lactone is between about 15:85 and 70:30.

15. Method as defined in claim 8 wherein the polyfunctional compound is ethylene glycol.

16. Method as defined in claim 8 wherein the polyfunctional compound is adipic acid.

17. Method as defined in claim 8 wherein the polyfunctional compound is trimethylol propane.

18. Method as defined in claim 8 wherein the polyfunctional compound is a mixture of ethylene glycol and 1,2,6-hexanetriol.

19. Method as defined in claim 8 wherein the polyfunctional compound is a mixture of ethylene glycol and 2-amino-2-methyl-1,3-propanediol.

20. Method as defined in claim 8 wherein the polyfunctional compound is 4,4'-methylenedianiline.

21. Method which comprises heating a lactone having the general formula

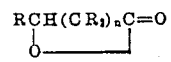

in which $n$ is an integer from 2 to 6, the R's are hydrogens when $n$ is 2 and at least six R's are hydrogens when $n$ is more than 2, any remaining R's being lower alkyl groups with a molar excess of a monohydric alcohol to form a hydroxy ester, reacting said ester with from about one-half to six and one-half mols of a vicinal epoxide per mol of lactone to form an ester ether, and heating said ester ether with an excess of organic chain-stopper selected from the group consisting of polyols, polyamines, amino alcohols, polycarboxylic acids, hydroxy carboxylic acids and amino carboxylic acids having a higher boiling point than said monohydric alcohol to form a mixture of hydroxyl-terminated oxyalkylene-carbooxyalkylene polymers.

22. Method which comprises heating a lactone having the general formula

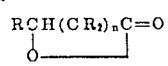

in which $n$ is an integer from 2 to 6, the R's are hydrogens when $n$ is 2 and at least six R's are hydrogens when $n$ is more than 2, any remaining R's being lower alkyl groups with a molar excess of a monohydric alcohol to form a hydroxy ester, reacting said ester with from about one-half to six and one-half mols of a vicinal epoxide per mol of lactone at a temperature between about 45° and 100° C. to form an ester ether, and heating said ester ether with an excess of organic chain-stopper selected from the group consisting of polyols, polyamines, amino alcohols, polycarboxylic acids, hydroxy carboxylic acids and amino carboxylic acids having a higher boiling point than said monohydric alcohol to a temperature in the range of about 120° to 250° C. to form a mixture of hydroxyl-terminated oxyalkylene-carbooxyalkylene polymers.

23. Method which comprises heating a lactone having the general formula

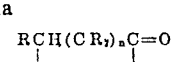

in which $n$ is an integer from 2 to 6, the R's are hydrogens when $n$ is 2 and at least six R's are hydrogens when $n$ is more than 2, any remaining R's being lower alkyl groups with a molar excess of a monohydric alcohol to a temperature in the range of about 60° to 100° C. to form a hydroxy ester, reacting said ester with from about one-half to six and one-half mols of a vicinal epoxide per mol of lactone at a temperature between 10° and 150° C. to form an ester ether, and heating said ester ether with an excess of organic chain-stopper selected from the group consisting of polyols, polyamines, amino alcohols, polycarboxylic acids, hydroxy carboxylic acids, and amino carboxylic acids having a higher boiling point than said monohydric alcohol to a temperature in the range of about 120° to 250° C. to form a mixture of hydroxyl-terminated oxyalkylene-carbooxyalkylene polymers.

References Cited in the file of this patent

UNITED STATES PATENTS

| | | |
|---|---|---|
| 2,456,503 | Hagemeyer | Dec. 14, 1948 |
| 2,559,510 | Mikeska et al. | July 3, 1951 |